US007027591B2

(12) United States Patent
Cairns

(10) Patent No.: US 7,027,591 B2
(45) Date of Patent: Apr. 11, 2006

(54) INTEGRATED NOISE CANCELLATION AND RESIDUAL ECHO SUPPRESSION

(75) Inventor: Douglas A. Cairns, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 143 days.

(21) Appl. No.: 10/272,095

(22) Filed: Oct. 16, 2002

(65) Prior Publication Data

US 2004/0076288 A1    Apr. 22, 2004

(51) Int. Cl.
*H04M 9/08*    (2006.01)

(52) U.S. Cl. ............................. 379/406.05; 379/406.07
(58) Field of Classification Search ................. 379/406, 379/406.05, 406.07
See application file for complete search history.

(56) References Cited

U.S. PATENT DOCUMENTS

| 5,636,272 | A  | 6/1997  | Rasmusson       |
| 5,796,819 | A  | 8/1998  | Romesburg       |
| 5,835,851 | A  | 11/1998 | Rasmusson et al.|
| 5,937,060 | A  | 8/1999  | Oh              |
| 6,148,078 | A  | 11/2000 | Romesburg       |
| 6,160,886 | A  | 12/2000 | Romesburg et al.|
| 6,185,300 | B1 | 2/2001  | Romesburg       |
| 6,301,357 | B1 | 10/2001 | Romesburg       |

FOREIGN PATENT DOCUMENTS

| WO | WO 98/33311 | 7/1998 |
| WO | WO 0119062  | 3/2001 |

OTHER PUBLICATIONS

Beghdad Ayad, Gerard Faucon and Regine Le Bouquin-Jeannes; Optimization of a Noise Reduction Preprocessing in an Acoustic Echo and Noise Controller; 1996; 4 pgs.

Seon Joon Park, Chum Gun Cho, Chungyong Lee, and Dae Hee Youn, On Integrating Acoustic Echo and Noise Cancellation Systems for Hands-Free Telephony; 4 pgs.

*Primary Examiner*—Sinh Tran
*Assistant Examiner*—Walter F Briney, III
(74) *Attorney, Agent, or Firm*—Coats & Bennett, P.L.L.C.

(57) ABSTRACT

A combined processor, such as might be used in a mobile handset or hands-free communication device, provides residual echo suppression and noise reduction while eliminating the need for explicit comfort noise generation. Operating within a near-end communication device, the processor receives an echo-canceled signal that is derived from a near-end input signal, and generates an output signal for subsequent transmission to a far-end communication device by applying a noise attenuation factor to the echo-canceled signal or to an average of that signal. The processor maintains the average signal across periods of speech and non-speech. During far-end-modes of operation, where only incoming audio from the far-end is active, the processor substitutes the average signal for the echo-canceled signal, such that a far-end listener receives the natural sounding average signal without receiving the objectionable, residual echo that may be in the echo-canceled signal.

61 Claims, 6 Drawing Sheets

INTEGRATED NOISE CANCELLATION AND RESIDUAL ECHO SUPPRESSION

BACKGROUND OF THE INVENTION

The present invention generally relates to a method and apparatus for echo suppression and noise cancellation in a communications device, and more particularly to integrated noise cancellation and residual echo suppression in a wireless communications device.

Near-end background noise and far-end echo are frequently present during communications between a far-end user and a near-end user. Most communications devices utilize noise and echo suppression techniques. Without such techniques, the far-end user receives a signal muddled by background noise and echo signals.

Echo processing is well known in the art. Generally, an echo processor operates in one of four speech modes: near-end mode (near-end speech only), far-end mode (far-end speech only), double-talk mode (near- and far-end speech), and quiet mode (no speech). Conventional echo processors include front-end echo cancellation as well as residual echo suppression and noise reduction capabilities. Many communication devices prone to echo problems use linear echo cancellers (LEC) to implement front-end echo cancellation. The resulting echo-canceled signal typically includes residual echo and near-end background noise.

Generally, a residual echo suppressor attenuates the echo-canceled signal to reduce the background noise and the residual echo. The amount of attenuation is dependent on the current speech mode. For example, in far-end mode, the residual echo suppressor increases the attenuation to effectively block the near-end input signal. This technique effectively suppresses background noise and residual echo, but the resulting echo- and noise-free signal received by the far-end user is unnaturally quiet. The sudden loss of background noise often makes the far-end user uncomfortable. Further, the unnatural silence may cause the far-end user to believe that the connection has been lost. To compensate, the echo processor at the near-end generates comfort noise for transmission to the far-end user during far-end mode.

While conventional echo suppression and noise reduction techniques effectively suppress or eliminate echo and background noise, these techniques also cause abrupt changes in received background noise levels. Further, because such techniques effectively block the near-end signal during some modes of operation, explicit comfort noise generation is required.

SUMMARY OF THE INVENTION

The present invention comprises a method and apparatus for combining residual echo suppression (RES) and noise reduction (NR) within a communication device, thereby eliminating the need for explicit comfort noise generation. Such need is eliminated by deriving an output signal for transmission by the near-end device from the echo-canceled (EC) signal, or from an average of the echo-canceled signal thereof, depending on a current mode of operation. During a far-end mode of operation, where there is only received audio from the far end, the output signal is generated by applying a first attenuation factor to the average echo-canceled signal, herein referred to as the average signal. The first attenuation factor is a function of an average noise. The average noise comprises an average of an estimated noise of the echo-canceled signal. Applying the first attenuation factor to the average signal avoids the need for comfort noise generation, while still preventing the return of objectionable echo to the far end.

In an exemplary embodiment, a combined processor within the communication device maintains the estimated noise, the average noise, and the average signal across all modes of operation. Such modes of operation include a far-end mode, where only far-end speech is active, a near-end mode where only near-end audio input (e.g. speech) is active, a double-talk mode where both far-end and near-end audio input are active, and a quiet mode, which may still include noise but where there is no active audio input, such as speech. Generally, the modes may be thought of as quiet mode and non-quiet mode, where the non-quiet mode encompasses all of the various speech modes.

The combined processor generates the output signal by operating on the EC signal responsive to a current operating mode. If the current operating mode is not the far-end mode, the processor generates the output signal by applying a second attenuation factor to the EC signal such that the far-end listener receives an echo-suppressed and noise-attenuated version of the actual near-end input signal.

However, during far-end mode, the processor generates the output signal by substituting the average signal for the EC signal and by substituting the first attenuation factor for the second attenuation factor. That is, the processor generates the output signal by applying the first attenuation factor to the average signal, thus avoiding the return of residual echo, which is particularly problematic in far-end modes, while still providing a natural sounding surrogate for the EC signal.

In one or more exemplary embodiments, the combined processor comprises a background noise estimator, an average signal generator, an output signal generator, and activity decision logic (mode control logic). The background noise estimator maintains the estimated noise by, in an exemplary embodiment, tracking a power spectral density (PSD) of the EC signal for quiet modes and for a combination of quiet and non-quiet modes. Further, the background noise estimator generates an average of the PSD during quiet and non-quiet modes. These PSD values determine the amount of attenuation applied by the output signal generator.

As with the background noise estimator, the average signal generator is active across all modes of operation, and maintains, in an exemplary embodiment, the average signal as a running average of the spectral magnitudes of the EC signal. As noted, it carries this averaging across quiet and non-quiet modes of operation such that the average signal provides a natural sounding surrogate for the EC signal during far-end mode operations. Note that the manner in which the average signal is maintained may be varied, but an exemplary approach uses an exponential weighting filter to develop the running average with a desired weighting bias between the older and newer signal values that form the average. Such exponential weighting or other desired filtering may also be applied to the PSD values maintained by the background noise estimator.

Regardless, the output signal generator receives the noise attenuation factors from the background noise estimator and receives the average signal from the average signal generator. Alternatively, the output signal generator may compute the first and second attenuation factors based on receiving the PSD values from the background noise estimator. Further, the output signal generator receives the EC signal from, for example, a front-end echo canceller that has removed at least some portion of the echoed far-end components from the near-end input signal. Thus, the output signal generator generates the output signal using the average signal or the EC signal, with its selective use of either signal being responsive to one or more mode indicator signals provided to it by the activity decision logic.

In either case, the output signal typically is subjected to additional processing by associated transceiver processing resources, and is formatted, processed or otherwise encoded for transmission to the far-end device, such as by sending the suitably processed output signal via wireless transmission to a supporting wireless network. Of course, as the present invention is readily adaptable to both wireless communication devices and land-line communication devices, the details of the network(s) supporting communication between the near-end and far-end devices may vary considerably.

DETAILED DESCRIPTION OF THE INVENTION

Figure 1:
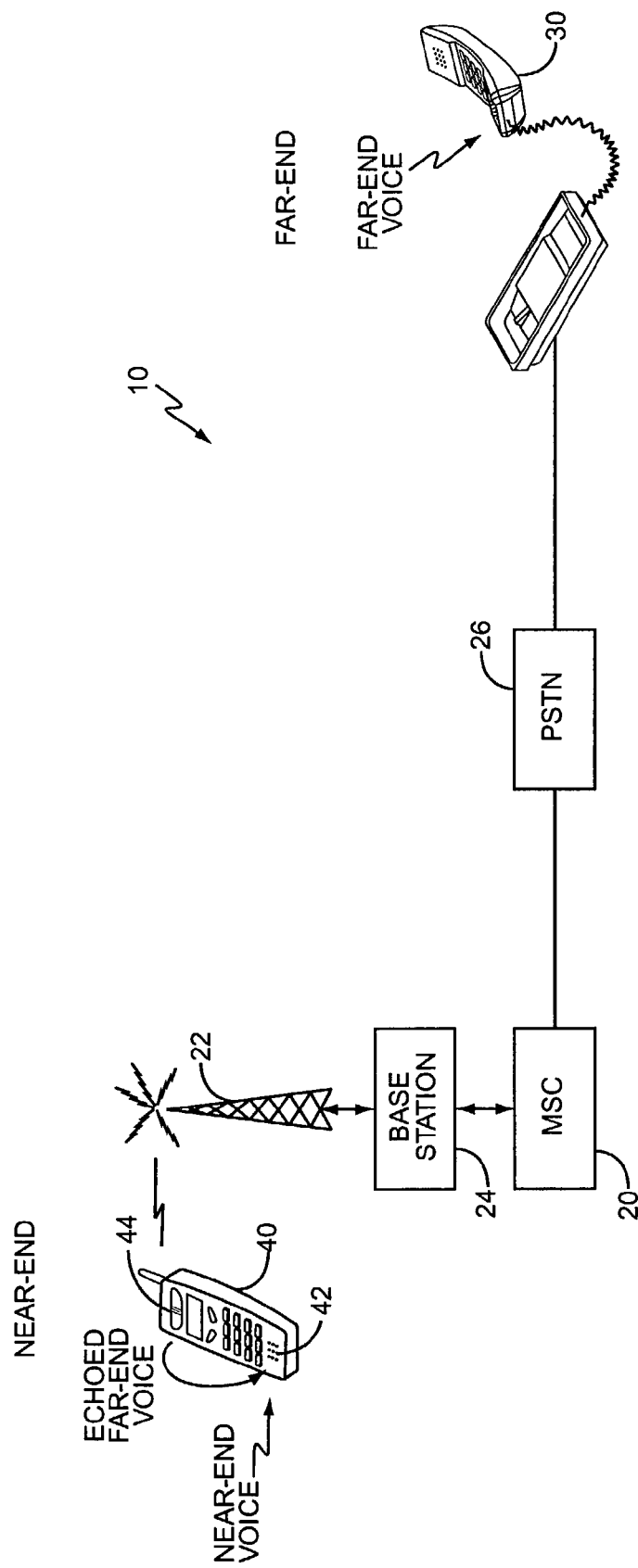
FIG. 1 illustrates an exemplary communications system in which the present invention may be used.

FIG. 1 illustrates an exemplary communications system 10 in which the echo suppression techniques of the present invention may be advantageously used. The communications system 10 includes a communications tower 22, base station 24, Mobile Switching Center 20 (MSC), and a transmission network, such as the Public Switched Telephone Network (PSTN) 26. A conventional near-end mobile terminal 40 communicates with a far-end conventional telephone handset 30 via communications system 10. The mobile terminal 40 receives and encodes a voice input from microphone 42, and transmits the voice signal to the MSC 20 via tower 22 and associated base station 24. MSC 20 further processes and transmits the received signals to a far-end conventional telephone handset 30 via PSTN 26. The telephone handset 30 outputs a facsimile of the mobile terminal user's voice based on these received signals.

Conversely, the telephone handset 30 conveys voice input from a far-end user to MSC 20 via PSTN 26. MSC 20 encodes and transmits the received far-end signal to mobile terminal 40 via base station 24 and tower 22. Mobile terminal 40 receives and decodes these transmitted signals. After decoding, mobile terminal 40 outputs a facsimile of the far-end user's voice at loudspeaker 44.

Voice signals from the far-end user, as reproduced by loudspeaker 44 in mobile terminal 40, undesirably couple into microphone 42 of mobile terminal 40, creating a far-end echo. Thus, the far-end user receives signals representative of the mobile terminal user's voice (near-end voice) and near-end background noise, as well as an echo signal representative of his or her own transmitted voice (echoed far-end voice). As newer mobile terminals 40 become increasingly smaller, the diminished physical separation of the included loudspeaker 44 and microphone 42 increases these acoustic coupling problems.

Figure 2:
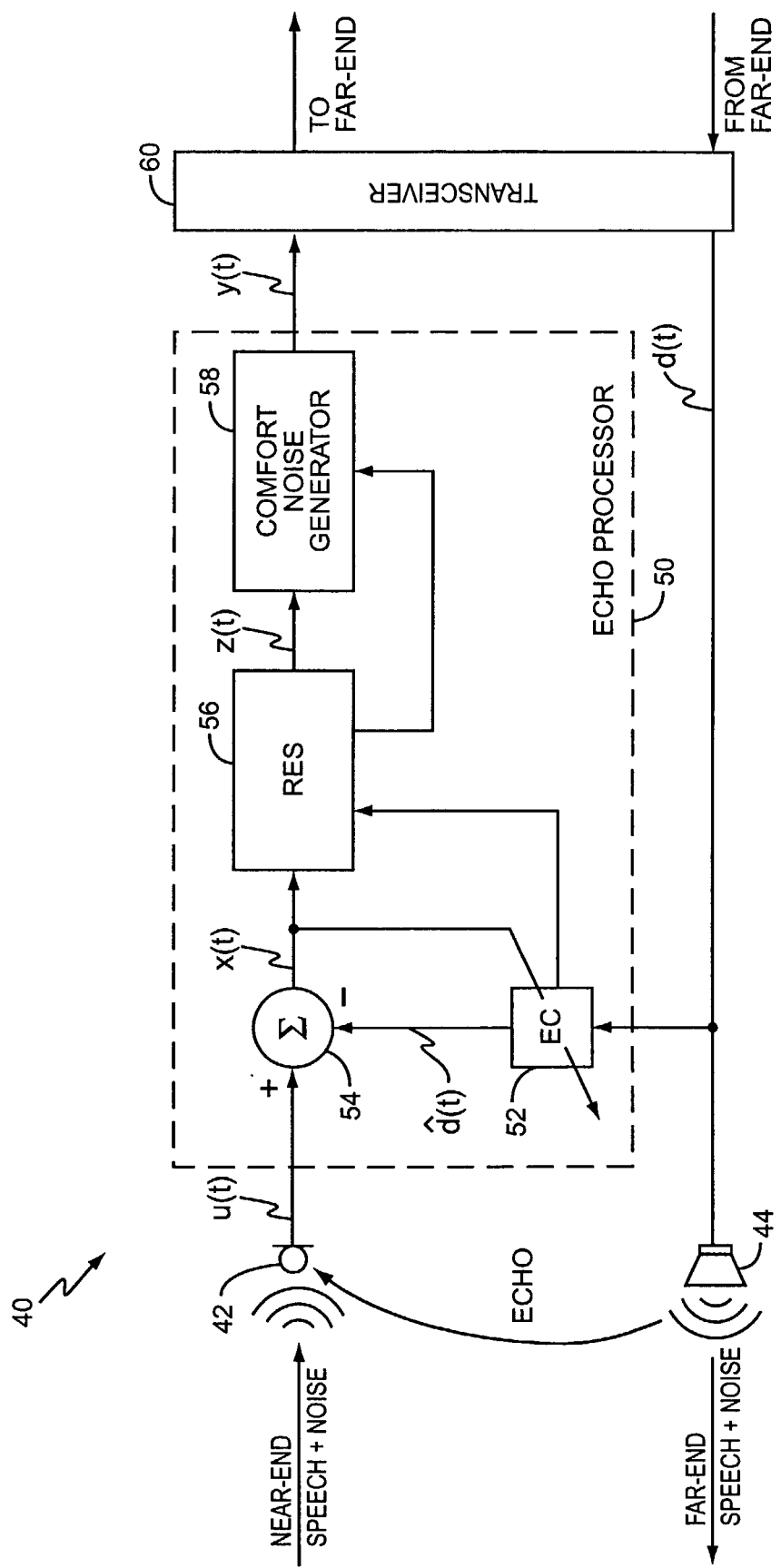
FIG. 2 illustrates conventional echo cancellation in a communications device.

FIG. 2 illustrates the conventional echo processing of mobile terminal 40, which includes microphone 42, loudspeaker 44, echo processor 50, and transceiver 60. Transceiver 60 processes near-end signals for transmission and received far-end signals, according to conventional methods. Transceiver 60 typically includes analog-to-digital circuitry (ADC), a transmitter digital signal processor (DSP), a modulator/RF amplifier, a receiver/amplifier, a receiver DSP, and digital-to-analog circuitry (DAC), not shown. The transmitter DSP (not shown) typically includes a speech coder and channel coder (not shown) to process the digitized near-end input signal prepare it for transmission in accordance with requirements of the communications system 10. The receiver DSP receives and processes the down-converted received signals in accordance with the requirements of the communications system 10, and produces output signal d(t). Loudspeaker 44 converts the digitized far-end signal d(t) produced by transceiver 60 into an audible signal representative of sounds (voice and noise) from the far-end communications device.

Mobile terminal 40 receives near-end acoustic signals at microphone 42 and converts these acoustic signals to a near-end input signal u(t). The near-end input signal u(t) includes signal components representative of the mobile terminal user's voice (desired voice), the near-end background noise (ambient noise), and/or far-end echo resulting from the audible signal from loudspeaker 44 coupling to microphone 42.

Echo processor 50 includes an echo canceller (EC) 52, which typically includes a linear echo canceller (LEC), summing junction 54, residual echo suppressor (RES) 56, and comfort noise generator 58. EC 52 functions as an adaptive filter to produce an estimate of the far-end echo signal, called the estimated-echo signal $\hat{d}(t)$, based on processing the near-end output signal d(t) generated by transceiver 60. Summing circuit 54 combines the near-end input signal u(t) with the estimated-echo signal $\hat{d}(t)$, and outputs an echo-canceled signal x(t). The main elements of the echo-canceled signal x(t) may be categorized as desired voice, background noise, and residual echo.

RES 56 receives echo-canceled signal x(t) and attenuates signal x(t), under the direction of a control signal provided by EC 52, to produce a residual echo suppressed signal z(t). Comfort noise generator 58 then adds comfort noise to residual echo suppressed signal z(t). The amount of comfort noise added by comfort noise generator 58 may depend on the attenuation of RES 56. For example, during far-end mode operations, z(t)→0 because RES 56 effectively blocks echo-canceled signal x(t), while during the remaining speech modes, z(t) may be nearly equivalent to x(t). Therefore, during far-end mode, comfort noise generator 58 adds comfort noise to signal z(t); during near-end, quiet, and double-talk modes, comfort noise generator 58 simply passes signal z(t).

Figure 3:
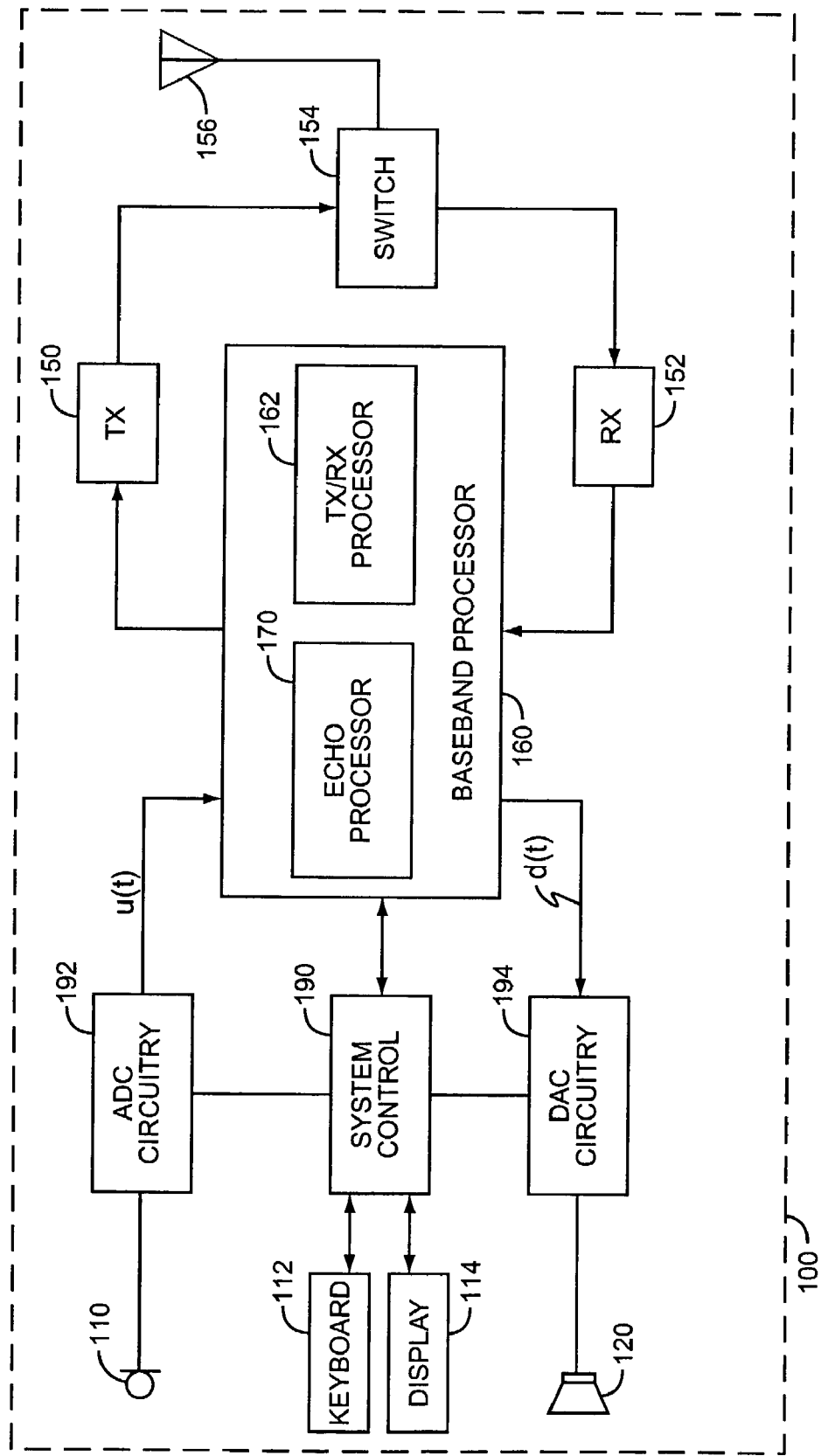
FIG. 3 illustrates an exemplary communications device that includes echo processing according to one or more embodiments of the present invention.

FIG. 3 illustrates a mobile terminal 100 according to the present invention. Mobile terminal 100 may be used in a conventional network, such as the network shown in FIG. 1. While FIG. 1 depicts a mobile terminal 40, such illustration is for benefit of understanding the discussion herein and should not be construed as limiting the application of the present invention. Echo suppression, as practiced in accordance with exemplary embodiments of the present invention, may involve echo suppression in or between various types of communication devices. Examples of such devices include mobile telephones, speaker-phones, hands-free communications devices, and various other voice or data systems. Thus, the present invention may be advantageously used to improve echo suppression in a broad range of communications devices and networks.

Mobile terminal 100 includes microphone 110, keypad 112, display, 114, and loudspeaker 120 for receiving and communicating signals and controls to and from mobile terminal 100. Mobile terminal 100 also includes transmitter 150, receiver 152, antenna assembly 156, baseband processor 160, system control 190, ADC 192, and DAC 194. System control 190 interfaces with baseband processor 160 and switch 154 to coordinate transmission and reception operations. Keypad 112 interfaces with the system control 190 and allows the user to dial numbers, enter commands, and select various options. Display 114 interfaces with the system control 190 and enables the user to monitor call status and view other service information.

Mobile terminal 100 receives signals from a far-end communications device through antenna assembly 156. Switch 154, in cooperation with antenna 156 and system control 190, switches received signals from antenna 156 to receiver 152. Receiver 152 down-converts the received signals to a desired baseband frequency. Receiver 152 may further amplify the down-converted signals to levels appropriate for subsequent processing by the baseband processor 160. Baseband processor 160 typically includes a transmitter/receiver (Tx/Rx) processor 162 and echo processor 170. Tx/Rx processor 162 processes the received signals according to conventional methods and generates a processed far-end signal d(t). Such processing may include equalization, demodulation, and decoding. Echo processor 170 implements echo cancellation.

DAC 194 converts the processed far-end signal d(t) to an analog audio signal. DAC 194 may include a digital-to-analog converter and other amplification and filtering circuitry, as necessary. Loudspeaker 120 receives the analog audio signal from DAC 194 and converts the analog audio signal into an analog signal representative of sounds (far-end voice and noise) from a far-end communications device (not shown). Microphone 110 detects and couples a portion of the sounds emanating from loudspeaker 120 with other near-end audio input signals.

ADC 192 generates a digitized near-end input signal u(t) of the audio input signal from microphone 110. The near-end input signal includes near-end speech, near-end background noise, and/or far-end echo. ADC 192 may include an analog-to-digital converter and other amplification and filtering circuitry, as necessary. Baseband processor 160 receives and processes the near-end input signal u(t) for transmission. Tx/Rx processor 162 and transmitter 150 processes the digitized near-end signal u(t) for transmission to a far-end user via antenna 156. Such processing may include echo processing, coding (speech and channel), up-conversion, modulation, and amplification.

Figure 4:
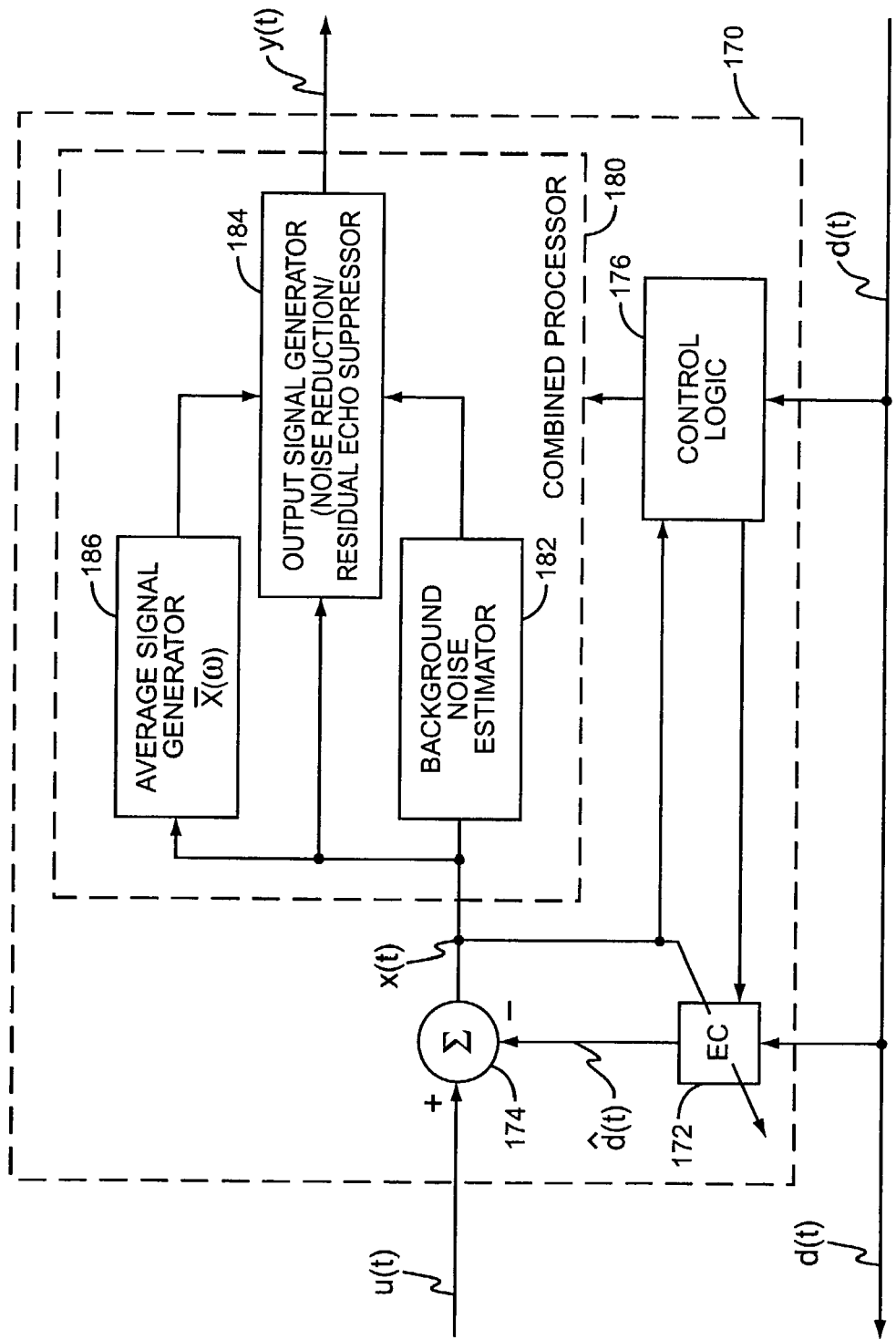
FIG. 4 illustrates exemplary echo processing details for the device of FIG. 3.

FIG. 4 further illustrates the details of echo processor 170. Echo processor 170 includes echo canceller 172, summing circuit 174, control logic circuit 176, and combined processor 180. Echo canceller 172 functions as an adaptive filter to produce an estimate of the far-end echo signal, d̂(t), based on processing the near-end loudspeaker output signal d(t). Summing circuit 174 combines an estimated echo signal d̂(t), generated by EC 172, with the near-end input signal u(t) to generate the echo-canceled (EC) signal x(t) for combined processor 180. Combined processor 180 generates an output signal by operating on the EC signal responsive to a current operating mode. The control logic 176 detects the current operating mode.

Combined processor 180 includes background noise estimator 182, output signal generator 184, and average signal generator 186. Combined processor 180 generates an output signal, Y(ω), during all modes of operation. During far-end mode, Y(ω) is a function of an average of the echo-canceled signal and an average of the estimated noise, as shown in Equation 1a. In Equation 1a, $\overline{X}(\omega)$ represents the average signal and $\overline{N}(\omega)$ represents the average noise.

$$Y(\omega)=\overline{X}(\omega)-\overline{N}(\omega),\qquad\text{(Equation 1a)}$$

During near-end, double-talk, and quiet modes, Y(ω) is a function of the EC signal X(ω) and the estimated noise $\hat{N}(\omega)$ (see Equation 1b).

$$Y(\omega)=X(\omega)-\hat{N}(\omega),\qquad\text{(Equation 1b)}$$

The background noise estimator 182 generates a first noise ratio, $\alpha_1(\omega)$, as a function of a power spectral density (PSD) of x(t) during quiet (noise only) mode ($\Phi_N(\omega)$) and an average of the PSD of x(t) across all (speech and noise) modes ($\overline{\Phi}_{N+S}(\omega)$), see Equation 2a.

$$\alpha_1(\omega) = \frac{\Phi_N(\omega)}{\overline{\Phi}_{N+S}(\omega)},\qquad\text{(Equation 2a)}$$

Further, the background noise estimator 182 generates a second noise ratio, $\alpha_2(\omega)$, as a function of a power spectral density (PSD) of x(t) during quiet mode ($\Phi_N(\omega)$) and a PSD of x(t) across all modes ($\Phi_{N+S}(\omega)$), see Equation 2b $$\alpha_2(\omega) = \frac{\Phi_N(\omega)}{\Phi_{N+S}(\omega)},\qquad\text{(Equation 2b)}$$

Equation 3 represents one method for calculating the average PSD across all modes, $\overline{\Phi}_{N+S}(\omega)$, where $\lambda_\Phi$ represents an exponential weighting factor.

$$\overline{\Phi}_{N+S}(\omega)=\lambda_\Phi\overline{\Phi}_{N+S}(\omega)+(1-\lambda_\Phi)\Phi_{N+S}(\omega),\qquad\text{(Equation 3)}$$

Different exponential weighting factors may be used during different modes of operation. For example, during quiet modes $\lambda_\Phi=\lambda_N$; during speech modes $\lambda_\Phi=\lambda_S$. Background noise estimator 182 may also calculate a first attenuation factor, $\beta_1(\omega)$, according to Equation 4a, and a second attenuation factor $\beta_2(\omega)$, according to Equation 4b.

$$\beta_1(\omega)=1-\alpha_1\qquad\text{(Equation 4a)}$$

$$\beta_2(\omega)=1-\alpha_2\qquad\text{(Equation 4b)}$$

Average signal generator 186 generates the average signal $\overline{X}(\omega)$. The average signal $\overline{X}(\omega)$ may be a running average of the EC signal X(ω) during all modes, calculated according to $$\overline{X}(\omega)=\lambda\overline{X}(\omega)+(1-\lambda)|X(\omega)|^2,\qquad\text{(Equation 5)}$$

where λ is an averaging constant.

Output signal generator 184 receives EC signal (X(ω)), the average signal ($\overline{X}(\omega)$), and first and second noise ratios ($\alpha_1(\omega)$, $\alpha_2(\omega)$). Output signal generator 184 may also receive first and second attenuation factors ($\beta_1(\omega)$, $\beta_2(\omega)$). When an indicator from control logic 176 indicates that a far-end mode is active, combined processor 170 generates the output signal Y(ω) as a function of the average signal $\overline{X}(\omega)$ and the average noise estimate $\overline{N}(\omega)$ according to Equation 6.

$$Y(\omega)=\overline{X}(\omega)-\overline{N}(\omega)=\overline{X}(\omega)\cdot(1-\alpha_1)=\overline{X}(\omega)\cdot\beta_1(\omega) \quad \text{(Equation 6a)}$$

$$\overline{N}(\omega)=\overline{X}(\omega)\cdot\alpha_1 \quad \text{(Equation 6b)}$$

When the indicator from control logic 176 indicates that near-end, double-talk, or quiet modes are active, combined processor 170 generates the output signal Y(ω) as a function of the EC signal X(ω) and the estimated noise $\hat{N}(\omega)$ as shown in Equation 7.

$$Y(\omega)=X(\omega)-\hat{N}(\omega)=X(\omega)\cdot(1-\alpha_2)=X(\omega)\cdot\beta_2(\omega) \quad \text{(Equation 7a)}$$

$$\hat{N}(\omega)=X(\omega)\cdot\alpha_2 \quad \text{(Equation 7b)}$$

The above equations are presented in frequency domain. It will be understood by those skilled in the art that combined processor 180 includes circuitry and/or software to calculate the Fourier transforms and inverse Fourier transforms, or other frequency domain transforms, of various signals, as required.

Figure 5:
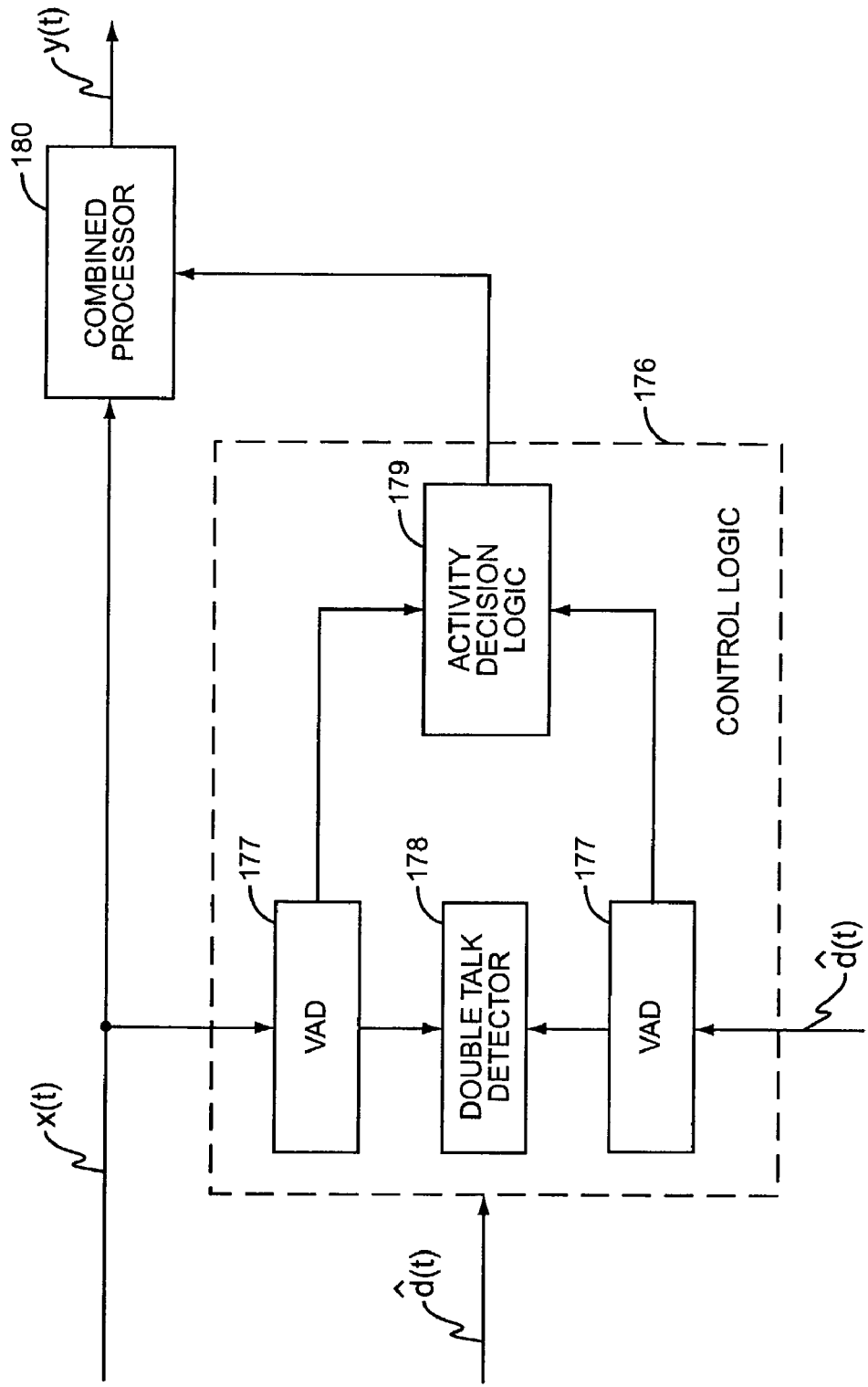
FIG. 5 illustrates exemplary control logic circuitry for the device of FIG. 4.

Control logic circuitry 176, illustrated in greater detail in FIG. 5, includes voice activity detectors (VAD) 177, double-talk detector 178, and activity decision logic 179. Control logic 176 receives the far-end signal d(t), the estimated echo signal $\hat{d}$(t), and the EC signal x(t). Activity decision logic 179 receives inputs from the VADs 177 and the double-talk detector 178, and determines which speech mode is currently active according to conventional methods. The activity decision logic 179 sends a speech mode indicator to the combined processor 170. This indicator selectively defines the mode of operation of the combined processor 170.

Figure 6:
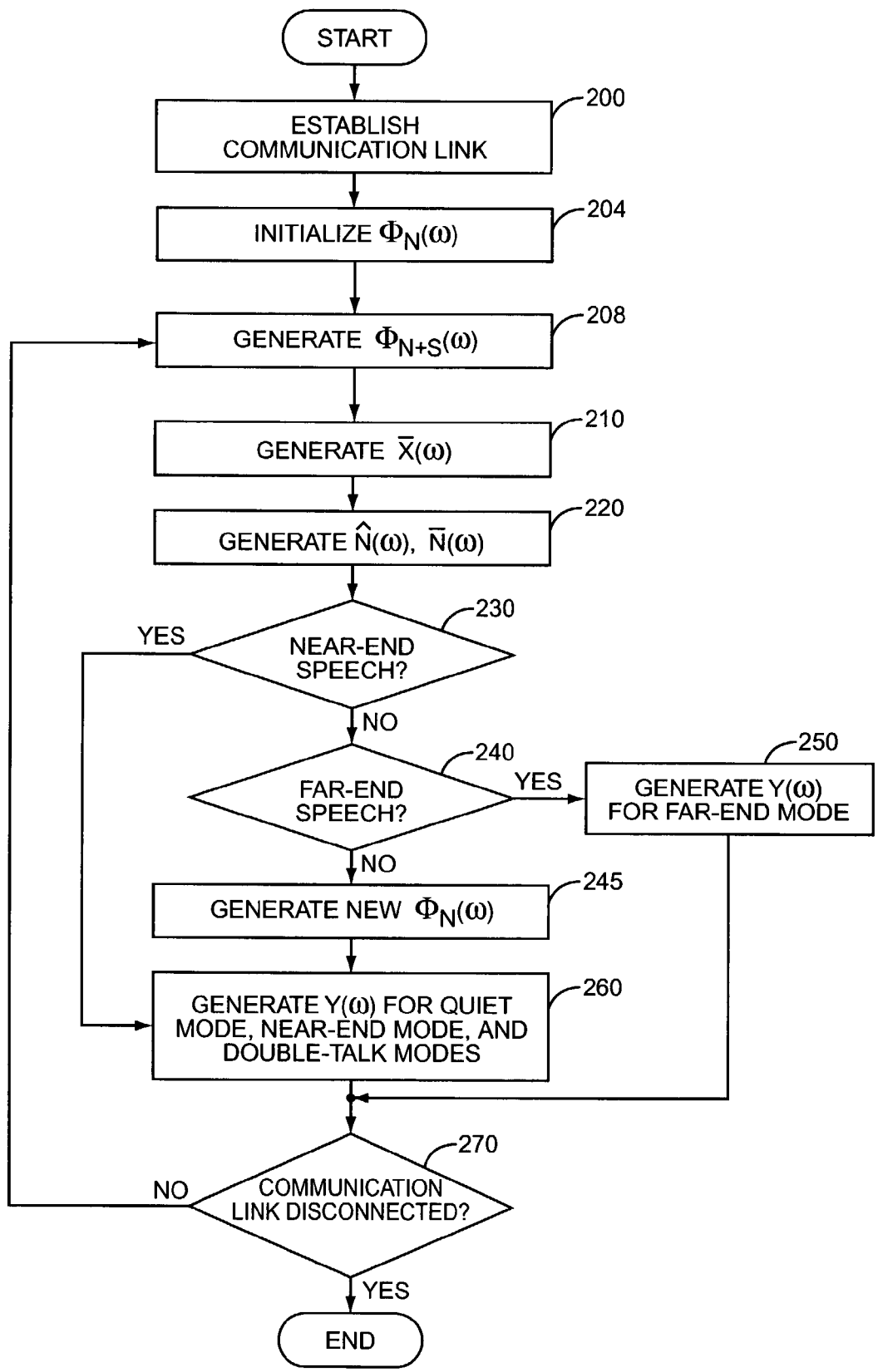
FIG. 6 illustrates exemplary flow logic for exemplary residual echo suppression and noise cancellation according to the present invention.

FIG. 6 illustrates an exemplary procedure for implementing the present invention. Shortly after a near-end mobile terminal 40 establishes a communication link with a far-end conventional telephone handset 30 (step 200), background noise estimator 182 initializes $\Phi_N(\omega)$ (step 204) and generates $\Phi_{N+S}(\omega)$ (step 208). Then, average signal generator 186 generates (step 210) an average signal $\overline{X}(\omega)$. The background noise estimator 182 generates (step 220) the estimated noise $\hat{N}(\omega)$ and the average noise $\overline{N}(\omega)$. If near-end speech is present (step 230), output signal generator 184 generates Y(ω) according to Equation 7 (step 260). Further, if neither near-end nor far-end speech is present (step 230, step 240), background noise estimator 182 generates a new $\Phi_N(\omega)$ (step 245, optional) and output signal generator 184 generates Y(ω) according to Equation 6 (step 260). If near-end speech is not present (step 230) and far-end speech is present (step 240), output signal generator generates Y(ω) according to Equation 6 (step 250). This process (steps 208–260) continues until the communication link is disconnected (step 270).

By implementing the integrated residual echo suppression/noise reduction during far-end mode, the present invention eliminates the need for explicit comfort noise generation by generating an output signal that is a function of the average signal. Therefore, the far-end user never experiences the abrupt changes associated with conventional echo processing techniques that omit comfort noise.

The foregoing description and drawings describe and illustrate the present invention in detail. However, the foregoing disclosure only describes some embodiments. Those skilled in the art will understand that the present invention is not limited to cellular telephones or other wireless communication devices. Therefore, the present invention embraces all changes and modifications that come within the meaning and equivalency range of the appended claims.

What is claimed is:

1. A method of reducing residual echo and noise in an echo-containing signal derived from a near-end input signal comprising:
    maintaining an average signal comprising an average of an echo-canceled signal across all modes of the near end signal, wherein the modes comprise a near-end mode, a far-end mode, a double-talk mode and a quiet mode;
    maintaining an estimated noise of the echo cancelled signal by maintaining a first power spectral density (PSD) value of the echo canceled signal for the quiet mode and a maintaining a second PSD value of the echo-canceled signal across all modes of operation;
    maintaining an average noise comprising an average of the estimated noise of the echo-canceled signal across all modes of the near-end signal;
    determining a first attenuation factor as a function of the average noise; and
    generating an output signal for transmission to a far-end communication device by applying the first attenuation factor to the average signal while operating in the far-end mode.

2. The method of claim 1, further comprising determining a second attenuation factor as a function of the estimated noise and generating the output signal by applying the second attenuation factor to the echo-canceled signal while operating in all modes but the far-end mode.

3. The method of claim 1, further comprising generating the output signal responsive to one or more mode indicator signals that indicate whether the far-end mode is active.

4. The method of claim 3, further comprising generating the one or more mode indicator signals responsive to sensing near-end speech and far-end speech.

5. The method of claim 1, wherein maintaining the average signal comprises maintaining a running average of the echo-canceled signal.

6. The method of claim 5, wherein maintaining the average signal comprises maintaining the running average of the echo-canceled signal according to, $$\overline{X}(\omega)=\lambda\overline{X}(\omega)+(1-\lambda)|X(\omega)|^2,$$

where $\overline{X}(\omega)$ is the average signal, X(ω) is the echo-canceled signal, and λ is an averaging constant.

7. The method of claim 5, wherein maintaining the average signal comprises maintaining a weighted average of past samples of the echo-canceled signals.

8. The method of claim 1, wherein maintaining the average signal comprises maintaining a frequency-domain average value of the echo-canceled signal.

9. The method of claim 8, wherein maintaining a frequency-domain average value of the echo-canceled signal comprises maintaining a running average of weighted spectral magnitudes for the echo-canceled signal.

10. The method of claim 9, wherein maintaining a running average of weighted spectral magnitudes comprises filtering successive magnitude samples of the echo-canceled signal with an exponential weighting filter.

11. The method of claim 10, further comprising setting a weighting coefficient of the exponential weighting filter as a function of speech-frame timing associated with the output signal, wherein the exponential weighting filter comprises a first exponential weighting filter during speech modes and a second exponential weighting filter during quiet mode.

12. The method of claim 1, wherein determining a second attenuation factor comprises determining a ratio of the first PSD value to the second PSD value.

13. The method of claim 12 wherein determining the second attenuation factor, $\beta_2(\omega)$, comprises calculating $\beta_2(\omega)$ according to, $$\beta_2(\omega) = 1 - \frac{\Phi_N(\omega)}{\Phi_{N+S}(\omega)},$$

wherein $\Phi_N(\omega)$ comprises the first PSD value, and $\Phi_{N+S}(\omega)$ comprises the second PSD value.

14. The method of claim 1, wherein determining a first attenuation factor as a function of the average noise comprises determining a ratio of the first PSD value to an average of the second PSD value.

15. The method of claim 14, wherein determining the first attenuation factor, $\beta_1(\omega)$, comprises calculating $\beta_1(\omega)$ according to, $$\beta_1(\omega) = 1 - \frac{\Phi_N(\omega)}{\overline{\Phi}_{N+S}(\omega)},$$

wherein $\Phi_N(\omega)$ comprises the first PSD value, and $\overline{\Phi}_{N+S}(\omega)$ comprises the average of the second PSD value.

16. The method of claim 15, further comprising calculating the average of the second PSD value, $\overline{\Phi}_{N+S}(\omega)$, according to $$\overline{\Phi}_{N+S}(\omega) = \lambda_\Phi \overline{\Phi}_{N+S}(\omega) = (1-\lambda_\Phi)\Phi_{N+S}(\omega)$$

where $\lambda_\Phi$ is an exponential weighting factor and $\Phi_{N+S}(\omega)$ is the second PSD value.

17. The method of claim 16 wherein the exponential weighting factor comprises a first exponential weighting filter during speech modes and a second exponential weighting filter during quiet mode.

18. A method of reducing noise and echo in an echo-containing signal comprising:
receiving a near-end input signal that includes near-end speech in a near-end mode, echoed far-end speech in a far-end mode, both near-end and echoed far-end speech in a double-talk mode, and no speech in a quiet mode;
canceling echo from the near-end input signal to form an echo-canceled signal;
maintaining an average signal comprising an average of the echo-canceled signal across all modes;
maintaining an estimated noise for the echo-canceled signal across all modes by maintaining a first power spectral density (PSD) value determined during operation in the quiet mode and a second PSD value determined during operation in all modes;
generating an average noise comprising an average of the estimated noise; and
generating an output signal for transmission to a far-end communication device by applying a first-attenuation factor, determined from the average noise, to the average signal for far-end mode operation, and applying a second attenuation factor, determined from the estimated noise, to the echo-canceled signal for other than far-end mode operation.

19. The method of claim 18, wherein maintaining an average signal comprises maintaining a spectral average of the echo-canceled signal across quiet and speech modes such that the output signal generated during far-end mode may be transmitted to the far-end communication device without need for added comfort noise.

20. The method of claim 19, wherein maintaining a spectral average of the echo-canceled signal comprises maintaining a running average of spectral magnitudes obtained from the echo-canceled signal across all modes of operation.

21. The method of claim 18 further comprising determining the second attenuation factor from a ratio of the first PSD value to the second PSD value.

22. The method of claim 18 further comprising determining the first attenuation factor from a ratio of the first PSD value to an average of the second PSD value.

23. The method of claim 18, wherein generating the output signal is based on a spectral subtraction operation.

24. An integrated processor for use in a communication device to reduce residual echo and noise in an echo-canceled signal derived from a near-end input signal, the processor comprising:
a background noise estimator to maintain an estimated noise of the echo-canceled signal and an average estimated noise of the echo-canceled signal taken across far-end, near-end, double-talk, and quiet modes of operations, wherein the background noise estimator maintains the estimated noise by determining a first power spectral density (PSD) value of the echo-canceled signal during a quiet mode of operation where there is no near-end speech or far-end speech and determining a second PSD value of the echo-canceled signal during quiet and non-quiet modes of operation;
an average signal generator to generate an average signal as an average of the echo-canceled signal taken across far-end, near-end, double-talk, and quiet modes of operation; and
an output signal generator to generate an output signal for transmission to a far-end communication device by applying a first attenuation factor to the average signal while operating in far-end mode and by applying a second attenuation factor to the echo-canceled signal while operating in all other modes;
wherein said first attenuation factor is determined as a function of the average estimated noise and said second attenuation factor determined as a function of the estimated noise.

25. The processor of claim 24, wherein the output signal generator is responsive to one or more mode indicator signals indicating a current mode of operation.

26. The processor of claim 25, wherein said current mode of operation includes one of a near-end mode, a double-talk mode, a quiet mode, or the far-end mode, and wherein the near-end input signal includes near-end speech in the near-end mode, echoed far-end speech in the far-end mode, near-end and echoed far-end speech in the double-talk mode, and no speech in the quiet mode.

27. The processor of claim 26, further comprising decision logic to determine the current mode of operation.

28. The processor of claim 25, wherein the background noise estimator generates the estimated noise of the echo-canceled signal for use in determining a second attenuation factor, wherein the output signal generator generates the output signal by applying the second attenuation factor to the echo-canceled signal in all modes other than the far-end mode.

29. The processor of claim 28, wherein the output signal generator substitutes the average signal for the echo-canceled signal and substitutes the first attenuation factor for the second attenuation factor during output signal generation responsive to the one or more mode indicator signals indicating that the far-end mode is active.

30. The processor of claim 24, wherein the background noise estimator determines the second attenuation factor by determining a ratio of the first PSD value to the second PSD value.

31. The processor of claim 30, wherein the ratio, $\beta_2(\omega)$, of the first PSD value to the second PSD value is calculated according to $$\beta_2(\omega) = 1 - \frac{\Phi_N(\omega)}{\Phi_{N+S}(\omega)},$$

wherein $\Phi_N(\omega)$ comprises the first PSD value, and $\Phi_{N+S}(\omega)$ comprises the second PSD value.

32. The processor of claim 24, wherein the background noise estimator determines the first attenuation factor based on determining a ratio of the first PSD value to an average of the second PSD value.

33. The processor of claim 32, wherein the output signal generator calculates the first attenuation factor as a scaling factor based on the ratio of the first PSD value to the average of the second PSD values.

34. The processor of claim 32, wherein the background noise estimator determines the first attenuation factor by calculating a ratio $\beta_1(\omega)$ according to, $$\beta_1(\omega) = 1 - \frac{\Phi_N(\omega)}{\overline{\Phi}_{N+S}(\omega)},$$

wherein $\Phi_N(\omega)$ comprises the first PSD value, and $\overline{\Phi}_{N+S}(\omega)$ comprises the average of the second PSD value.

35. The processor of claim 34, wherein the background noise estimator calculates the average of the second PSD value $\overline{\Phi}_{N+S}(\omega)$ according to, $$\overline{\Phi}_{N+S}(\omega) = \lambda_\Phi \overline{\Phi}_{N+S}(\omega) + (1-\lambda_\Phi) \Phi_{N+S}(\omega),$$

wherein $\lambda_\Phi$ is an exponential weighting factor, and further wherein the exponential weighting factor comprises a first exponential weighting filter during speech modes and a second exponential weighting filter during quiet mode.

36. The processor of claim 24, wherein the average signal generator maintains the average signal as a running average of the echo-canceled signal.

37. The processor of claim 36, wherein the average signal generator calculates the running average of the echo-canceled signal as a weighted average of past samples of the echo-canceled signals.

38. The processor of claim 36, wherein the average signal generator calculates the running average of the echo-canceled signal according to, $$\overline{X}(\omega) = \lambda \overline{X}(\omega) + (1-\lambda)|X(\omega)|^2,$$

where $\overline{X}(\omega)$ is a frequency-domain representation of the running average of the echo-canceled signal $X(\omega)$ and $\lambda$ is an averaging constant.

39. The processor of claim 24, wherein the average signal generator maintains the average signal as a frequency-domain average value of the echo-canceled signal.

40. The processor of claim 39, wherein the average signal generator maintains the frequency-domain average value of the echo-canceled signal as a running average of weighted spectral magnitudes for the echo-canceled signal.

41. The processor of claim 40, wherein the average signal generator calculates the average of weighted spectral magnitudes by filtering successive magnitude samples of the echo-canceled signal with an exponential weighting filter.

42. The processor of claim 41, wherein the average signal generator sets a weighting coefficient of the exponential weighting filter as a function of speech-frame timing associated with the output signal, and wherein the exponential weighting filter comprises a first exponential weighting filter during speech modes and a second exponential weighting filter during quiet mode.

43. The processor of claim 24, wherein the processor comprises a digital logic circuit incorporated into a wireless communication device.

44. A wireless communications device comprising:
a receiver for receiving and a far-end signal;
a microphone for receiving a near-end signal, wherein said near-end signal includes a near-end background noise signal and an echo of said far-end signal;
a front-end echo suppressor for generating an echo-canceled signal as a function of said near-end signal, wherein said echo-canceled signal includes a residual echo signal and said near-end background noise signal;
an integrated processor for reducing residual echo and noise in said echo-canceled signal comprising:
an output signal generator to generate an output signal for processing and transmission to a far-end communications device by applying a first attenuation factor to an average signal while operating in a far-end mode, wherein the average signal comprises an average of the echo-canceled signal;
an average signal generator to generate the average signal for use by the output signal generator; and
a background noise estimator to maintain an average noise of the echo-canceled signal for use in determining the first attenuation factor used by the output signal generator, wherein the background noise estimator maintains the estimated noise by determining a first power spectral density (PSD) value of the echo-canceled signal during a quiet mode of operation where there is no near-end speech or far-end speech and determining a second PSD value of the echo-canceled signal during quiet and non-quiet modes of operation, wherein the average noise comprises an average of an estimated noise of the echo-canceled signal.

45. The wireless communications device of claim 44, wherein the output signal generator is responsive to one or more mode indicator signals indicating a current mode of operation.

46. The wireless communications device of claim 45, wherein said current mode of operation includes one of a near-end mode, a double-talk mode, a quiet mode, or the far-end mode, and wherein the near-end input signal includes near-end speech in the near-end mode, echoed far-end speech in the far-end mode, near-end and echoed far-end speech in the double-talk mode, and no speech in the quiet mode.

47. The wireless communications device of claim 46, further comprising decision logic to determine the current mode of operation.

48. The wireless communications device of claim 46, wherein the background noise estimator generates the estimated noise of the echo-canceled signal for use in determining the second attenuation factor, and the output signal generator generates the output signal by applying the second attenuation factor to the echo-canceled signal in all modes other than the far-end mode.

49. The wireless communications device of claim 48, wherein the output signal generator substitutes the average signal for the echo-canceled signal and substitutes the first attenuation factor for the second attenuation factor during output signal generation responsive to the one or more mode indicator signals indicating that the far-end mode is active.

50. The processor of claim 44, wherein the background noise estimator determines the second attenuation factor by determining a ratio of the first PSD value to the second PSD value.

51. The processor of claim 50, wherein the second attenuation factor, $\beta_2(\omega)$, is calculated according to $$\beta_2(\omega) = 1 - \frac{\Phi_N(\omega)}{\Phi_{N+S}(\omega)},$$

wherein $\Phi_N(\omega)$ comprises the first PSD value, and $\Phi_{N+S}(\omega)$ comprises the second PSD value.

52. The wireless communications device of claim 44, wherein the background noise estimator determines the first attenuation factor based on determining a ratio of the first PSD value to an average of the second PSD value.

53. The wireless communications device of claim 52, wherein the background noise estimator calculates the first attenuation factor as a scaling factor based on the ratio of the first PSD value to the average of the second PSD value.

54. The wireless communications device of claim 52, wherein the first attenuation factor, $\beta_1(\omega)$, is calculated according to $$\beta_1(\omega) = 1 - \frac{\Phi_N(\omega)}{\overline{\Phi}_{N+S}(\omega)},$$

wherein $\Phi_N(\omega)$ comprises the first PSD value, and $\overline{\Phi}_{N+S}(\omega)$ comprises the average of the second PSD value.

55. The wireless communications device of claim 44, wherein the average signal generator maintains the average signal as a running average of the echo-canceled signal.

56. The wireless communications device of claim 55, wherein the average signal generator calculates the running average of the echo-canceled signal as a weighted average of past samples of the echo-canceled signals.

57. The wireless communications device of claim 55, wherein the average signal generator calculates the running average of the echo-canceled signal according to, $$\overline{X}(\omega) = \lambda \overline{X}(\omega) + (1-\lambda)|X(\omega)|^2,$$

where $\overline{X}(\omega)$ is a frequency-domain representation of the running average of the echo-canceled signal $X(\omega)$ and $\lambda$ is an averaging constant.

58. The wireless communications device of claim 44, wherein the average signal generator maintains the average signal as a frequency-domain average value of the echo-canceled signal.

59. The wireless communications device of claim 58, wherein the average signal generator maintains the frequency-domain average value of the echo-canceled signal as a running average of weighted spectral magnitudes for the echo-canceled signal.

60. The wireless communications device of claim 59, wherein the average signal generator calculates the average of weighted spectral magnitudes by filtering successive magnitude samples of the echo-canceled signal with an exponential weighting filter.

61. The wireless communications device of claim 60, wherein the average signal generator sets a weighting coefficient of the exponential weighting filter as a function of speech-frame timing associated with the output signal, and wherein the exponential weighting filter comprises a first exponential weighting filter during speech modes and a second exponential weighting filter during quiet mode.

* * * * *